United States Patent [19]
Tung et al.

[11] Patent Number: 5,919,872
[45] Date of Patent: *Jul. 6, 1999

[54] PROCESS FOR CRYSTALLIZING BLENDS OF POLYETHYLENE TEREPHTHALATE AND POLYETHYLENE ISOPHTHALATE

[75] Inventors: William C. T. Tung, Tallmadge; Joseph P. Schirmer, Akron; Patrick J. Pesata, Medina, all of Ohio

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,498

[22] Filed: Jun. 12, 1997

[51] Int. Cl.$^6$ ...................................................... C08L 67/02
[52] U.S. Cl. ............................................ 525/439; 525/444
[58] Field of Search ...................................... 525/439, 444

[56] References Cited

U.S. PATENT DOCUMENTS

| | | |
|---|---|---|
| 2,863,854 | 12/1958 | Wilson . |
| 3,888,817 | 6/1975 | Georgoudis . |
| 4,008,206 | 2/1977 | Chipman et al. . |
| 4,171,422 | 10/1979 | Lazarus et al. . |
| 4,327,207 | 4/1982 | Lazarus . |
| 4,348,314 | 9/1982 | Lazarus et al. . |
| 4,374,961 | 2/1983 | Kudo et al. . |
| 4,403,090 | 9/1983 | Smith . |
| 4,418,188 | 11/1983 | Smith et al. . |
| 4,424,337 | 1/1984 | Smith et al. . |
| 4,482,586 | 11/1984 | Smith et al. . |
| 4,551,368 | 11/1985 | Smith et al. . |
| 4,604,257 | 8/1986 | Smith et al. . |
| 4,643,925 | 2/1987 | Smith ........................................ 525/444 |
| 5,314,925 | 5/1994 | Brunell et al. . |
| 5,523,361 | 6/1996 | Tung ........................................ 525/439 |
| 5,563,209 | 10/1996 | Schumann ............................... 525/439 |

FOREIGN PATENT DOCUMENTS

| | | |
|---|---|---|
| 236255 | 9/1987 | European Pat. Off. . |
| 2005715 | 12/1969 | France . |
| 7210069 | 6/1968 | Japan . |
| 4005631 | 5/1970 | Japan . |
| 1000531 | 6/1974 | Japan . |

OTHER PUBLICATIONS

Chemical Abstracts, vol. 82, No. 4, Jan. 27, 1975, Columbus, Ohio, US, Abst. No. 17805; Shima Takeo et al; "High--polymerization-degree polyester" XP002019271-See Abst. & JP 49/005, 917B (Teijin Ltd.) Feb. 9, 1974.

*Primary Examiner*—Patricia A. Short
*Attorney, Agent, or Firm*—Dennis V. Carmen

[57] ABSTRACT

Polyester blends of polyethylene terephthalate and polyethylene isophthalate coated with an alkylene carbonate such as ethylene carbonate or propylene carbonate crystallize more quickly and at lower temperature than uncoated pellets, reducing the tendency of the pellets to stick together during the crystallization process prior to solid-state polymerization.

16 Claims, No Drawings

PROCESS FOR CRYSTALLIZING BLENDS OF POLYETHYLENE TEREPHTHALATE AND POLYETHYLENE ISOPHTHALATE

1. FIELD OF THE INVENTION

The present invention pertains to the field of polyester polymer blends, and more particularly to preventing a polyethylene terephthalate/polyethylene isophthalate polymer blend from sticking and agglomerating during its heat up cycle by coating the blend with an alkylene carbonate to form a crystalline structure on the surface of the blend.

2. BACKGROUND OF THE INVENTION

The manufacture of high molecular weight polyester polymers typically requires a two-step process. The first step, melt polymerization, reacts the monomers in the melt to achieve a relatively low molecular weight, usually amorphous polyester polymer having an intrinsic viscosity up to no more than about 0.6. This is followed by a second step where the polymer is solid-state polymerized to a high molecular weight with an intrinsic viscosity greater than 0.6. After melt polymerization, the amorphous polymer is generally formed into the shape of pellets or chips to achieve favorable solid-state reaction rates.

In order to solid state polymerize the amorphous polymer and achieve higher molecular weight, crystallinity, and a higher intrinsic viscosity, it is necessary to health the amorphous pellets or chips from room temperature to above their crystallization temperature but below their melt temperature. Once the pellets crystallize, they loose their tendency to stick together. During the course of the heat up cycle to reach the crystallization temperature of the polyester polymer, it is desirable to maintain the chips or pellets as discrete units and avoid having them stick together to both prevent plugging the reactor vessel and to manufacture a polyester polymer with a more uniform molecular weight distribution. If the pellets stick or clump together, it is not possible to proceed ahead at higher temperatures with a solid-state polymerization process and obtain a commercially acceptable product.

The problem of sticking and agglomeration of polyethylene naphthalate (PEN) pellets during the heat up cycle was described in U.S. Pat. No. 5,523,361. This patent addressed the sticking problem specifically associated with PEN polymers. Because the crystallization temperature of the PEN polymer is so high (180–200° C.), the patent teaches that the PEN polymer passes through its glass transition sticking temperature (about 140° C.) prior to crystallization, resulting in sticking and clumping. The patent teaches that the solution to this problem was to coat the PEN polymer with an alkylene carbonate such as ethylene carbonate or propylene carbonate prior to crystallization. The carbonate-coated PEN pellets crystallize more rapidly and at a lower temperature than uncoated PEN, reducing or eliminating the tendency of the pellets to stick together during the crystallization process.

PEN polymers are not the only polymers which stick and clump together during the crystallization heat up cycle of the solid-state polymerization process. Like PEN polymers, polyethylene isophthalate (PEI) polymers also stick and clump during the crystallization heat up cycle because the glass transition temperature of PEI is quite low, about 50° C. However, unlike PEN polymers, we have found that coating alkylene carbonates, such as ethylene carbonate, onto PEI would not prevent PEI from sticking during its heat up cycle. Sufficient surface crystallinity on PEI could not be induced to prevent sticking above 50° C. Thus, unlike PEN polymers, coating an alkylene carbonate on PEI was not a solution to avoid sticking. The problem of sticking during the heat up cycle in solid-state polymerization could not be solved by looking to the state of the art associated with polyethylene terephthalate (PET) because this polymer typically does not exhibit a sticking problem during the crystallization heat up cycle in the solid-state process.

It would be desirable to utilize the solid-state process with polyalkylene isophthalate polymers (PAI) for numerous applications because their barrier resistance to atmospheric moisture and oxygen are 2 to 8 times better than PET polymers. However, to commercially manufacture a polyester polymer containing PAI, and specifically PEI, the sticking problem must first be overcome.

3. SUMMARY OF THE INVENTION

We have found that coating an alkylene carbonate onto a blend of polyalkylene terephthalate/polyalkylene isophthalate polymers (PAT/PAI) successfully reduced or prevented the PAT/PAI pellets from sticking together during the crystallization heat up cycle, even though coating an alkylene carbonate onto a PAI polymer alone, such as PEI, did not prevent the PEI from sticking and clumping. Without the carbonate coating, the PAT/PAI blend will stick and clump.

In particular, there is now provided a process for crystallizing an araorphous aromatic polyester blend comprising a polyester polymer comprising isophthalate units and a polyester polymer comprising terephthalate units, wherein said process comprises:

(a) mixing polyester pellets of said blend with an alkylene carbonate; and (b) heating the mixture of alkylene carbonate and polyester pellets to a temperature effective to crystallize at least an outer portion of the polyester pellets.

There is also provided a process for solid-stating an aromatic polyester blend comprising a polymer comprising terephthalate units and a polymer comprising isophthalate units, wherein the said process comprises:

(a) preparing a polyalkylene terephthalate polymer comprising reacting an alkylene diol and terephthalic acid or an alkyl ester thereof under melt condensation polymerization conditions;

(b) preparing a polyalkylene isophthalate polymer comprising reacting an alkylene diol with isophthalic acid or an alkyl ester thereof under melt condensation polymerization conditions;

(c) blending the polyalkylene terephthalate polymer and the polyalkylene isophthalate polymer to produce a feed polymer blend;

(d) converting said feed polymer blend having a first average molecular weight into a plurality of pellets, and mixing the pellets with an alkylene carbonate to coat at least a portion of the pellets with the alkylene carbonate;

(e) heating the coated pellets to a temperature effective to crystallize at least a portion of the surface of the coated pellets; and subsequently (f) solid-stating the crystallized feed polymer pellets to produce a polyester polymer blend having a second average molecular weight higher than said first average molecular weight.

4. DETAILED DESCRIPTION OF THE INVENTION

The invention process is designed for treatment of blends of PAT and PAI. By a PAT polymer is meant a polyester having aromatic groups in the polymer chain at least a portion of which are terephthalate units. By a PAI polymer is meant a polyester having aromatic groups in the polymer chain at least a portion of which are isophthalate units. The amount of terephthalate and isophthalate units in each polymer is not particularly limited. Suitable PAT polymers are those having terephthalate units ranging from 40 mole percent to 100 mole percent, preferably from 80 mole percent to 100 mole percent, based on the mole percent of aromatic units in the PAT polyester polymer. Likewise, suitable PAI polymers are those having, from 40 mole percent to 100 mole percent of isophthalate units, preferably from 60 mole percent to 100 mole percent, more preferably from 80 mole percent to 100 mole percent, based on the moles of aromatic units in the PAI polymer.

The PAI is produced by the reaction of an isophthalic compound, that is isophthalic acid, or esters of isophthalic acid, with a multifunctional hydroxyl bearing compound. The alkyl esters of isophthalic acid can generally contain a total of from 10 to 20 carbon atoms, with from 10 to 16 carbon atoms being preferred. Specific examples of diesters of isophthalic acid include dimethylisophthalate and diethylisophthalate, with these two compounds being preferred.

In addition to the isophthalic compound utilized in the manufacture of PAI, other types of dicarboxylic acids or their esters may optionally be added. Additional dicarboxylic acids include an alkyl dicarboxylic acid, an aryl dicarboxylic acid, an alkyl substituted aryl dicarboxylic acid, a dimer acid, or esters thereof, or an alkali salt of sulfo dialkyl isophthalate. Alkyl dicarboxylic acids desirably contain from 4 to 12 carbon atoms. If the acids are alkyl or aryl substituted aryl acids, they desirably contain from 9 or 10, respectively, to about 16 carbon atoms.

Dimer dicarboxylic acids are an example of alkyl dicarboxylic acids. Other examples of alkyl dicarboxylic acids include glutaric acid, adipic acid, azelaic acid, sebacic acid, and the like.

Dimer acid generally has a range of from about 34 to 40 carbon atoms and preferably 36 carbon atoms. The dimer is itself prepared from an unsaturated fatty acid containing 18 carbon atoms such a linoleic and linolenic acid or the monohydric alcohol esters thereof. The actual preparation and structure of dimerized C18 fatty acids are described in J.A.C.S. 66,84 (1944) and U.S. Pat. No. 2,347,562, both of which are fully incorporated herein by reference. Several different grades of dimer acid are available from commercial sources and these differ from each other primarily in the amount of monobasic and trimer acid fractions and the degree of unsaturation. It is preferred that the dimer acid be substantially free of the monobasic and trimer acids fractions, that is less than 8 percent by weight, and essentially completely saturated. Some commercially available grades of dimer acid contain 95–97 percent dimer acid, 3–4 percent trimer acid, and essentially 0 to 1 percent monobasic acids and extremely low unsaturation.

As noted above, the other dicarboxylic acids, besides the isophthalic compounds, utilized in preparing the PAI can be an alkyl or an aryl substituted aryl acid containing from 9 or 10, respectively, to about 16 carbon atoms. Typical examples of aryl acids include terephthalic acid, naphthalic acids, specifically 2,6-naphthalene dicarboxylic acid, phenylindane dicarboxylic acid, and the like. Specific examples of alkyl substituted aryl acids include the various isomers of dimethylphthalic acid such as dimethylterephthalic acid, the various isomers of diethylphthalic acid such as diethyl-terephthalic acid, the various isomers of dimethylnaphthalic acid such as 3,7-dimethyl-2,6-naphthalene dicarboxylic acid and 2,5-dimethyl-1,6-naphthalene dicarboxylic acid, and the various isomers of diethylnaphthalene dicarboxylic acid, and the like.

The amount of the dicarboxylic acid or esters thereof (non-isophthalic compound) utilized with the isophthalic compound on a molar basis is generally from about zero (that is 0), or from greater than 0 to about 60 mole percent. Desirably, the amount is from 0 percent to about 40 mole percent and preferably from about 0.0 percent to about 20 mole percent, each based on the weight of all acids utilized in the manufacture of the PAI.

In a preferred embodiment of the invention, the PAI polymer is a homopolymer with respect to the carboxylic acid used in the manufacture of the polymer. That is, 100% of the acids used to make the PAI polymer are based on isophthalic compounds, such as the free acid or the different esters thereof.

While some isophthalic compound may be added to a PAT and some terephthalic compound may be added to a PAI, a polymer is classified as a PAT or a PAI depending on which polymer contains the greater mole percent of terephthalic compound or isophthalic compound added to the reaction mixture, respectively.

A highly preferred PAI is PEI, which contains at least 40 mole percent of ethylene glycol, utilized in the reaction with the isophthalic compound. However, as noted., a PAI can contain up to about 60 mole percent of one or more additional glycols, generally 45 mole percent or less, and desirably 35 mole percent or less, having from 3 to 12 carbon atoms. It is desirable that such additional diols contain 10 carbon atoms or less and preferably 6 carbon atoms or less, especially aliphatic or cycloaliphatic diols. Examples of diols include propylene glycols such as trimethylene glycol, butylene glycols such as tetramethylene glycol, neopentyl glycol, cyclohexanedimethanol, and the like. Another class of diols include the glycol ethers which contain from 4 to 12 carbon atoms, preferably 4 to 8 carbon atoms, with specific examples including diethylene glycol and 1,4-dihydroxyethoxy benzene.

Generally, a glycol is utilized such that the PEI has a glass transition temperature of generally from about 35° C. to about 100° C., usually from about 55° C. to about 75° C.

The isophthalic compound reaction as well as the use of the optional dicarboxylic acid or ester thereof (other than an isophthalic compound) is made utilizing conventional amounts of conventional catalysts, additives, and the like, for example, colorants, chain branching agents, stabilizers, and the like.

Generally, all of the various reactants are added and made in a conventional manner. For example, all reactants are commonly added to the esterification or the transesterification stage, and followed by a polycondensation stage to produce the polyesters.

The total amount of diols utilized in comparison to the total amount of acids (isophthalic compound and non-isophthalic compound) are conventional. Typically, the molar ratio of the total amount of diol utilized compared with the total amount of acid is approximately 1.05 to 2.5 and approximately 2.2 when esters are used in lieu of acids. Of course, much higher or lower ratios can be used as known to the art. Naturally, if the isophthalic compound is an ester and the copolymer is made, the other monomer is also preferably an ester, that is a diester of a dicarboxylic acid. When esters are used as a starting material, the polyester is therefore made using any conventional ester route as is well known to the art. If the isophthalic compound is an acid, and a copolymer is made, the other acid monomer is preferably a dicarboxylic acid (other than an isophthalic acid), etc., and the polyester is made according to any conventional non-ester route.

The methods for manufacturing PAT are also well known to those of skill in the art. The above teachings with respect to other types of carboxylic acids, other type; of glycols, reaction conditions, and their amounts are also applicable to the manufacture of PAT. PET polyesters can be prepared by condensation polymerization of the esterification reaction product of one or more aromatic dicarboxylic acids, at least one of which is terephthalic acid and alkylene diol such as ethylene glycol. Alternatively, the polymerization starting material can be prepared by the transesterification reaction of a terephthalate ester such as dimethyl terephthalate and an alkylene diol, catalyzed with a suitable catalyst such as manganese acetate. PEI polyester may be prepared in the same manner, by direct condensation reactions between and alkylene diol and isophthalic acid or by transesterifying the alkylene diol with an isophthalate ester. Preferred PAT polymers are PET polymers, with PET homopolymers being especially preferred. U.S. Pat. No. 4,447,595 which is also incorporated herein by reference in its entirety describes a good method for the preparation of the PET.

Melt blends of PET with PEI can be prepared by either reactor blending or blending in an extruder. In extruder blending, preblended dry chips or pellets are usually mixed together. In reactor blending, one of the specific polymers is added to the other at or near the end of the melt polymerization step. A third procedure involves merging two reaction melt streams together and mixing them.

Regardless of which blend process is utilized, the temperature of mixing should be at a temperature above the melting point of the highest melting polyester. Generally, such mixing temperature is from about 20° C. to about 40° C. above said high melting point polyester. By melting point is meant the thermodynamic crystallite melting point. Generally, it is desirable to minimize the time that the PAT and PAI are molten for blending. Such melt blends will have an intrinsic viscosity (IV) of at least 0.3 dl/g to about 0.7 dl/g in a 60/40 solution of phenol and tetrachloroethane at about 30° C.

The amount of PAI in the PAT/PAI blend ranges from 5 weight percent to 50 weight percent, based on the weight of the polymer blend. In many applications, the amount of PAI in the blend will range from 20 weight percent to 45 weight percent. Preferably, the PAI and PAT are PEI and PET, respectively, more preferably each being a homopolymer with respect to the carboxylic acid used in the preparation of the polymers.

High molecular weight polyester resin blends can be prepared by solid state polymerizing the amorphous, relatively low molecular weight polymer blend (referred to herein as the "feed polymer blend"). The feed polymer blend can be prepared as noted above under condensation polymerization conditions, generally in the presence of a polycondensation catalyst such as antimony trioxide or an organotitanate, at an elevated temperature and in a reduced pressure environment. The reaction is generally carried out to the point at which the reaction product can be easily pelletized, and then the reaction product is extruded in the desired pellet, cube, chip or other small particle form, which will be collectively referred to herein as "pellets."

The feed polymer blend pellets are then mixed with an alkylene carbonate such as, for example, ethylene carbonate or propylene carbonate. The mixing conditions are such that the alkylene carbonate is distributed on the surface of the pellets. Although a uniform coating of the alkylene carbonate on the pellet surfaces is not required, it is desirable that mixing is accomplished so as to distribute the alkylene carbonate on the surface of essentially all the pellets. The alkylene carbonate will generally be present on the pellets in an amount effective to reduce the crystallization temperature of the polyester, generally within the range of about 0.1 to about 10, preferably about 0.5 to about 3 weight percent, based on the weight of the polyester. Amounts as low as 1 weight percent or less have been found to adequately reduce or eliminate the sticking problem.

The alkylene carbonate can be applied, for example, by placing the pellets in an aqueous solution of the alkylene carbonate and then removing the water, for example, by flash evaporation; by spraying the alkylene carbonate on the pellets; or by stirring, tumbling, or agitating a mixture of the pellets and solid alkylene carbonate. The preferred technique is to introduce the alkylene carbonate as an aqueous solution into the solid-state polymerization vessel, add the amorphous PAT/PAI feed polymer blend pellets, and mix the pellets and alkylene carbonate while evaporating the water. This process can be carried out prior to or simultaneously with devolatilization of the PAT/PAI polymer blend under reduced pressure and/or inert gas flow at an elevated temperature lower than the polymer crystallization temperature.

Suitable alkylene carbonates include carbonates prepared by reacting an alkylene diol with a carbonate precursor, such as phosgene, a haloformate or a carbonates ester. The number of carbon atoms in the alkylene diol moiety is preferably 2–3, and the preferable carbonates are ethylene carbonate and propylene carbonate.

Crystallization of the feed polymer blend is carried out by heating the coated blend pellets, preferably with stirring, to the crystallization temperature of the coated polyester blend, within the range of about 60° C. to about 180° C., preferably about 70° C. to about 150° C. In order to accomplish the objective of reducing the tendency of the pellets to stick together, it is generally sufficient for crystallization of the polyester blend to occur at the pellet surface, characterized by haziness of the surface of the pellets. The presence of the alkylene carbonate generally reduces the time and temperature required for crystallization of the polyester blend, so that crystallization can usually be accomplished before the polyester blend reaches its sticking temperature.

The blend of the PAT and PAI polymers can be solid-state polymerized in a batch or in a continuous process. Generally, a polymer blend of PEI and PET will be solid state polymerized at a temperature of from about 200° C. to about 265° C.

The solid-state polymerization is normally conducted in the presence of a stream of inert gas. The inert gas stream serves to remove volatile reaction by products, such as water, glycols, and acetaldehyde, and also helps to heat the polyester. Usually, between about 0.05 to about 2 liters of inert gas per hour will be passed through the solid state reactor per kilogram of total polymer. Some suitable inert gases for use in the solid-state polymerization process include nitrogen, carbon dioxide, helium, argon, neon, krypton, xenon, and certain industrial waste gases. Various combinations or mixtures of different inert gases can also be used. In most cases nitrogen will be used as the inert gas. The solid-state polymerization process can also be conducted in a vacuum instead of a stream of inert gas.

The blend of the PET and PEI polymers is solid-state polymerized for a time sufficient to increase the molecular weight of the polymer blend beyond the molecular weight of the feed polymer blend, in most cases, to an I.V. of 0.7 dl/g or greater with it being, desirable to polymerize to an I.V. of at least 0.9 dl/g for some applications. The amount of time required for the solid state polymerization will normally be from about 1 hour to about 36 hours. More commonly the solid state polymerization time will range from 8 to 24 hours.

The solid stated polymer blends of PET/PEI are suitable for making such articles as tire yarn, packaging materials, molded containers, films, and the like. The polymer blends can be used to make single layer or multi-layer articles for use with comestibles, for example foodstuffs, as containers which can be blow-molded and used for beverages, for example, various juice drinks, such as orange juice, grape juice, etc., for carbonated beverages such as soft drinks, as medicine bottles, or as films to envelope various items, for example wrap, such as meat, groceries, and the like. A particular use is in the form of containers for various alcoholic beverages such as beer, wine, liquor, and the like. Since carbon dioxide tends to migrate out of a container and since oxygen can migrate into the container and quickly affect the taste of various items such as foodstuffs, wine, beer, champagne, liquor, and the like, the articles made with the PET/PEI blends are particularly suitable for containing such items.

In multi-layer articles, various colorants may be utilized in either the barrier layer or the polyterephthalate layer, or in all the layers. Whenever the multi-layered polyester article is utilized with regard to foodstuffs, beverages, cosmetics, and the like, preferably the barrier layer constitutes an outer layer or a non-foodstuff, etc., contacting layer and contains the colorants therein. This permits colorants to be utilized which otherwise could not be utilized with foodstuffs, beverages, etc. If colorants are utilized in the polyterephthalate layer, it is necessary to only use FDA approved colorants. The colorants can be added at any stage during the preparation of the polyester material as during the esterification or transesterification stage, the polycondensation stage, during resin drying, during extruding, and the like.

Generally, any colorant, that is dyes which are soluble, or inorganic or organic pigments can be utilized. Examples of dyes include the various azo dyes, anthraquinone dyes, azine dyes, and the like. Examples of inorganic pigments which are added to the polyester to impart a color or hue thereto include titanium dioxide, carbon black, iron oxide, chromium oxide greens, iron blue, chrome green, violet pigments, ultramarine pigments, titanate pigments, pearlescent pigments, metallic pigments such as aluminum, browns, powders, etc., arid the like. Organic pigments include monazo pigments, disazo pigments, and the like. Naturally, various amounts are utilized to impart a desired color or hue and such amounts can vary over a wide range.

The multi-layer articles, films, containers, and the like can be mace utilizing many forming techniques or methods. For example, such items can be made by extrusion; injection molding; rotational molding; forming one of the layers by dipping in solution; and the like. In order to obtain good physical properties, somewhere during the forming process, it is desirable that orientation is imparted to the various polyester layers. Since the polyesters in the barrier layer generally have low glass transition temperatures, they naturally can be processed at lower temperatures than polyterephthalates. Such lower temperatures result in process energy-saving advantages as well as reducing undesirable byproducts such as linear and cyclic oligomers, as well as acetaldehyde. Also, lower temperatures permit coating without crystallizing the base preform in the bottle making process typically used for carbonated soft drink and the like.

Films can generally be formed by coextruding calendaring, or solvent casting. Orientation can be imparted to films by stretching the films through a series of rollers operating at different speeds in either one direction or in two directions 90 degrees normal to one another. Containers can be formed through injection molding or rotational molding with the layered materials then being subjected to a later orientation process. A preferred method of forming a container is to injection mold a preform containing multiple layers therein and then to blow mold the preform, thereby imparting orientation thereto. Regardless of the forming technique or method, the polyterephthalate layer is generally located on the inside of the container, especially with regard to any foodstuffs, and the like, to be contained therein, and the barrier layer containing the PET/PEI or PAT/PAI blend is located on the outside of the multi-layered article.

When laminates are made by calendaring or extruding films, the two films can be coextruded or simultaneously extruded or brought together while warm. Optionally, they can be separately made and then heated at temperatures near the glass transition temperature and then contacted together as by rolling. Regardless of procedure, the inherent adhesion between the two different types of polyesters has been found to be very good due to the compatibility of the layers. Accordingly, adhesion or peeling problems are very small or nil.

In making a bottle preform then making a container through the injection molding technique, sequential injection molding can be utilized. That is, the first item can be injection molded, immediately transferred to a second cavity and then the second material injection molded thereover. Desirably, the first injection molded material is PET, with the second molded material being the polyester blend utilized in the barrier layer containing PET/PEI or PAT/PAI. This is convenient from a temperature standpoint in that the PET layer or article will tend to cool before insertion thereof into a second but larger mold, and therefore would be at a lower temperature, since the polyester blend utilized in the barrier layer would be molded at a lower temperature. Alternatively, the first item injection molded can be cooled lo ambient or room temperature, even stored if desired, inserted into a second mold and, optionally reheated with the second type of material, i.e. a polyester blend being injection molded thereover.

If a multi-layer article is made for example, a container such as a bottle or the like, the multi-layer article can be made in the form of a reduced size, for example a preform, in a manner as set forth immediately above. The preform can contain any number of layers therein, but desirably has two layers, one of each material, and is then subjected to a reheat blow-molding operation. That is, the article such as a preform is reheated to a desirable temperature and then blow-molded. Not only does the blow-molding operation achieve biaxial orientation of the layers, thereby improving strength, but also produces the desired end product.

In the blow-molding operation, it is desirable to place the heating element or heat source adjacent to the inner or polyterephthalate layer since this layer has a slightly higher blow-molding temperature. Thus, if a bottle were made, it would be desirable to heat the preform from the inside. However, since this heating method is not readily practiced in bottle manufacture, the preform is generally heated from the outside to a temperature above a desirable blow-molding temperature of the barrier layer, thereby bringing the PET layer up to temperature. The preform is then permitted to cool for a short time so that the outside layer, that is the, barrier layer, is cooled more rapidly than the inside layer. The preform is then subjected to a blow-molding operation.

Another method relates to dipping an already formed bottle into a heated polymer solution of the polymer blend to form a coating thereon.

The invention will be better understood by reference to the following examples.

COMPARATIVE EXAMPLE 1

This experiment illustrates the effect of coating PEI polyester pellets with ethylene carbonate and subjecting the pellets to crystallization conditions.

30 g of PEI were coated with 0.6 g of a solution of 0.3 g of ethylene carbonate in 0.3 g of water, and subsequently air dried. The coated PEI pellets were placed in a glass rotoevaporator flask submerged in a heating bath. The flask was rotated and heating initiated. When the temperature reached 64° C., the pellets were grossly stuck together.

COMPARATIVE EXAMPLE 2

This example demonstrates that PET pellets do not need to be coated with a carbonate to prevent sticking.

30 g of uncoated amorphous PET pellets were placed in a rotoevariorator flask and the same heating experiment described above was carried out. The temperature was raised to 150° C. at which point the pellets crystallized. The pellets did not stick to each other during the heating cycle up to the crystallization temperature of PET.

EXAMPLE 3

40 g of an 80/20 wt. % blend of PET/PEI pellets were coated by mixing them with 1.2 g of an ethylene carbonate solution (33% in water) and boiling off the water. The coated pellets were introduced into a glass rotoevaporator flask in a heating bath, slowly stirred by rotating the flask, and heated to 132° C. Upon reaching this temperature, the pellets turned hazy, indicating crystallization had occurred, but no sticking was observed during the heat cycle up to this temperature.

In a control experiment, 40 g of a 20/80 wt. % blend of PET/PEI pellets were added to the glass rotoevaporator flask and heated to 132° C. Some sticking was observed among the pellets during the heat up cycle.

EXAMPLE 4

The same experiment as in Example 3 above was carried out, except using pellets made of a 75/25 wt. % blend of PET/PEI. No sticking was observed during the heat up cycle of pellets coated with ethylene carbonate, while a great degree of sticking was observed in a control experiment when the pellets were left uncoated during the heat up cycle.

EXAMPLE 5

40 g of a 80/20 wt. % blend of PET/PEI pellets were treated with 0.4 g of propylene carbonate. The coated pellets were added to a glass rotoevaporator reactor and heated to 132° C. in the same manner as in Example 3. Again, no sticking was observed during the heat up cycle to this temperature.

EXAMPLE 6

40 g of a 60/40 wt. % blend of PET/PEI pellets were placed in a rotoevaporator flask partially immersed in a water bath at room temperature. 1 wt. % of a 50% solution of ethylene carbonate in water was added to the flask and mixed with the pellets. The heating bath temperature was elevated to 130° C., at which point the pellets were hazy, indicating crystallization of the pellets. No sticking problem was observed. The pellets were further heated up to 230° C. in a glass reactor, during which time no sticking of the pellets was observed. This indicates that one should not likely encounter any sticking problems during, solid state polymerization of the pellets in a dryer-blender.

EXAMPLE 7

100 pounds of a 75/25 wt. % blend of PET/PEI pellets having an intrinsic viscosity of about 0.59 were charged to a dryer-blender held at 40° C. 1 wt. % of a 50% solution of ethylene carbonate in water was added to the dryer-blender. Rotation was started at a heat up rate of about 1° C./minute. When the temperature reached 150° C., the pellets were inspected. No sticking among the pellets was observed. Solid state polymerization of the pellets was successfully carried out by raising the temperature of the pellets in the dryer-blender to 220° C. for 14 hours until the pellets attained an intrinsic viscosity of 0.845 dl/g.

EXAMPLE 8

40 g of a 60/40 wt. % blend of PET/PEI pellets were placed in a flask of a rotoevaporator partially submerged in a water bath at room temperature. 0.75 wt. % of a 50% solution of ethylene carbonate in water was added to the flask. The temperature of the bath was elevated to 130° C., at which point the pellets crystallized. No sticking problem was observed during the heat up cycle.

What we claim is:

1. A process for crystallizing an amorphous aromatic polyester blend comprising a polyester polymer comprising isophthalic units and a polyester polymer comprising terephthalic units, said process comprising:
   (a) mixing alkylene carbonate onto polyester pellets comprising said blend; and
   (b) heating the mixture of alkylene carbonate and polyester pellets to a temperature effective to crystallize at least an outer portion of the polyester pellets.

2. The process of claim 1, wherein the alkylene carbonate is selected from the group consisting of ethylene carbonate and propylene carbonate.

3. The process of claim 1, wherein the alkylene carbonate is present in an amount within the range of about 0.5 to about 3 weight percent, based on the weight of the polyester.

4. The process of claim 1, wherein the blend comprises a polyethylene terephthalate polymer and a polyethylene isophthalate polymer.

5. The process of claim 4, wherein the amount of polyethylene isophthalate polymer in the blend ranges from 5 wt. % to 50 wt. %, based on the weight of the blend.

6. The process of claim 5, wherein the amount of polyethylene isophthalate polymer in the blend ranges from 20 wt. % to 45 wt. %, based on the weight of the blend.

7. The process of claim 6, wherein the alkylene carbonate comprises ethylene carbonate or propylene carbonate.

8. The process of claim 7, wherein the polyester pellets are coated with from 0.5 wt. % to 3 wt. % of the alkylene carbonate, based on the weight of the blend.

9. The process of claim 1 wherein step (b) comprises heating the mixture of alkylene carbonate and polyester pellets to a temperature within the range of about 60° C. to about 180° C. for a time within the range of about 20 to about 60 minutes.

10. A process for solid stating an aromatic polyester blend comprising a polymer comprising terephthalate units and a polymer comprising isophthalate units, the process comprising:
- (a) preparing a polyalkylene terephthalate polymer comprising reacting an alkylene diol and terephthalic acid or an alkyl ester thereof under melt condensation polymerization conditions;
- (b) preparing a polyalkylene isophthalate polymer comprising reacting an alkylene diol with isophthalic acid or an alkyl ester thereof under melt condensation polymerization conditions;
- (c) blending the polyalkylene terephthalate polymer and the polyalkylene isophthalate polymer to produce a feed polymer blend;
- (d) converting said feed polymer blend having a first average molecular weight into a plurality of pellets, and mixing the pellets with an alkylene carbonate to coat at least a portion of the pellets with the alkylene carbonate;
- (e) heating the coated pellets to a temperature effective to crystallize at least a portion of the surface of the coated pellets; and subsequently
- (f) solid-stating the crystallized feed polymer pellets to produce a polyester polymer blend having a second average molecular weight higher than said first average molecular weight.

11. The process of claim 10, wherein the alkylene carbonate is selected from the group consisting of ethylene carbonate and propylene carbonate.

12. The process of claim 10, wherein the alkylene carbonate is present in an amount within the range of about 0.5 to about 3 weight percent, based on the weight of the feed polymer blend.

13. The process of claim 10, wherein the polyester comprises a blend of polyethylene terephthalate and polyethylene isophthalate.

14. The process of claim 13, wherein the polyester pellets comprise from 5 wt. % to 50 wt. % of polyethylene isophthalate polymer.

15. The process of claim 14, wherein the polyester pellets comprise from 20 wt. % to 45 wt. % of polyethylene isophthalate polymer.

16. The process of claim 15, wherein step (e) comprises heating the polyester pellets to a temperature within the range of about 60° C. to about 180° C. for a time within the range of about 20 to about 60 minutes.

* * * * *